(12) United States Patent
Taylor

(10) Patent No.: US 9,230,235 B2
(45) Date of Patent: Jan. 5, 2016

(54) ROOM INVENTORY MANAGEMENT

(71) Applicant: Accenture Global Services Limited, Dublin (IE)

(72) Inventor: Gregory Taylor, Herndon, VA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 53 days.

(21) Appl. No.: 13/673,189

(22) Filed: Nov. 9, 2012

(65) Prior Publication Data

US 2014/0136377 A1    May 15, 2014

(51) Int. Cl.
G06Q 10/00 (2012.01)
A01K 5/02 (2006.01)
G06F 17/50 (2006.01)
G06Q 10/08 (2012.01)

(52) U.S. Cl.
CPC .................................... *G06Q 10/087* (2013.01)

(58) Field of Classification Search
None
See application file for complete search history.

(56) References Cited

U.S. PATENT DOCUMENTS

| 7,983,956 | B1* | 7/2011 | Goel | 705/26.1 |
| 8,280,748 | B2* | 10/2012 | Allen et al. | 705/2 |
| 8,458,023 | B2* | 6/2013 | Bous | 705/14.1 |
| 2004/0172652 | A1* | 9/2004 | Fisk et al. | 725/78 |
| 2004/0267567 | A1* | 12/2004 | Barrera et al. | 705/2 |
| 2006/0095434 | A1* | 5/2006 | McCullough et al. | 707/10 |
| 2007/0075136 | A1* | 4/2007 | Jacob | 235/383 |
| 2008/0091480 | A1* | 4/2008 | Geoghegan et al. | 705/5 |
| 2009/0287629 | A1* | 11/2009 | Gabriel et al. | 706/47 |
| 2012/0016699 | A1 | 1/2012 | Gilmore et al. | |
| 2012/0185590 | A1* | 7/2012 | Kolin et al. | 709/224 |
| 2012/0249307 | A1* | 10/2012 | Eisenberg et al. | 340/10.1 |

(Continued)

FOREIGN PATENT DOCUMENTS

| JP | 07-028833 A | 1/1995 |
| JP | 3043376 U | 11/1997 |

(Continued)

OTHER PUBLICATIONS

The examiner defines "key" as "in database management systems, a key is a field that you use to sort data. It can also be called a key field, sort key, index, or key word. For example, if you sort records by age, then the age field is a key." See www.webopedia.com, definition of "key", retrieved on Jul. 19, 2013 from http://www.webopedia.com/TERM/.*

(Continued)

*Primary Examiner* — Peter L Ludwig
(74) *Attorney, Agent, or Firm* — Mannava & Kang, P.C.

(57) ABSTRACT

According to an example, a method for room inventory management may include generating inventory records for rooms for a predetermined time period. An inventory record may include an inventory record index representing a physical property of an associated room, and an inventory record attribute representing a modifiable attribute of the associated room. The method may further include generating keys to identify one or more of the inventory records based on attributes associated with the keys. A key may include a key index that matches the inventory record index for one or more of the inventory records. The method may also include receiving selections of the keys from the generated keys, and generating, by a processor, virtual room pools by grouping the selected keys for each of the selections and the inventory records identified by the selected keys for each of the selections.

20 Claims, 11 Drawing Sheets

(56) References Cited

U.S. PATENT DOCUMENTS

2012/0278090 A1    11/2012  Frankfort et al.
2013/0096963 A1*    4/2013  Craig et al. .................. 705/5
2013/0159731 A1*    6/2013  Furukawa ................... 713/189

FOREIGN PATENT DOCUMENTS

| JP | 2004-178001 A | | 6/2004 | |
| JP | 2004-213347 A | | 7/2004 | |
| JP | 2011-008833 A | | 1/2011 | |
| WO | WO 00/63794 | * | 10/2000 | ............ G06F 17/00 |
| WO | WO 2012/000430 | * | 5/2012 | ............ G06F 21/24 |

OTHER PUBLICATIONS

Japanese Patent Office, English translation of "Decision to Grant Patent" on JP patent application No. 2013-231515, dated Oct. 28, 2014, 3 pages.

* cited by examiner

ROOM INVENTORY MANAGEMENT

BACKGROUND

Management of room inventory in the hotel industry typically includes creating specific pools of rooms based on various attributes. For example, rooms with beds of a specific size, such as, king sized beds, may be pooled in a different pool compared to rooms with queen size beds. Such pools of rooms may be created for a variety of other attributes, such as, for example, combinations based on hotel location, room location by floor, room size, seasonal availability, special features, etc. Once the pools of rooms are created, customers may be booked for a specific room by searching the pools and charging based, for example, on the specific attributes associated with one or more of the pools a room belongs to. If the customer specifies an attribute for which a room is not available (i.e., the room does not exist in one of the pools that includes that attribute), the customer may be provided with other alternative rooms (i.e., rooms from other pools with some of the customer's chosen attributes).

Based on factors, such as, for example, the extensive inventory of rooms for large scale hotels, the extensive array of attributes that can be used to create room pools, etc., creation of room pools requires extensive time and effort. For example, for hotels that may manage thousands of rooms across the world, creation of room pools can require years of effort. Once the room pools are created, changes in factors, such as, for example, business conditions, customer requirements, attributes, etc., can also require changes in room pools and/or creation of new room pools. However, since the room pools are relatively fixed structures, any changes to the pool structures are typically performed for factors that may be relevant in the foreseeable future. This is because for certain factors, such as, for example, availability of a new room feature that may be relevant for a short duration, the time it takes to change a pool structure can exceed the duration of such a new room feature, and/or value associated with the new room feature. The relatively fixed nature of the room pools can limit adaptability of hotels to changes, for example, in business conditions, and customer requirements, and for other aspects, such as, for example, testing of future products.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
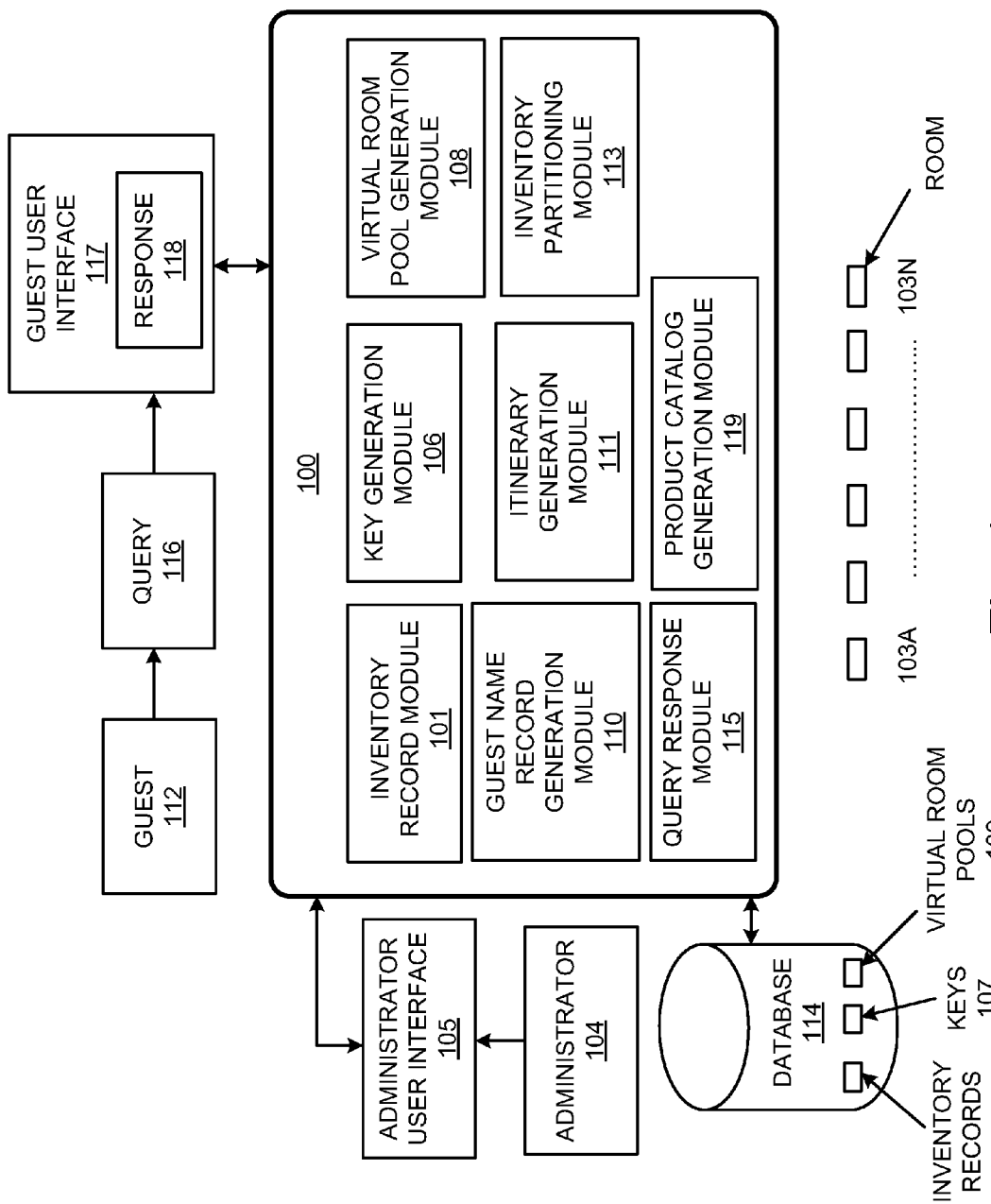
FIG. 1 illustrates an architecture of a room inventory management system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to an example, a room inventory management system and a method for room inventory management are described. The room inventory management system may generally include a memory storing machine readable instructions to generate inventory records for rooms for a predetermined time period. The rooms may be hotel rooms, or generally, rooms in a hospitality environment. An inventory record may include, for example, an inventory record index representing a physical property of an associated room, and an inventory record attribute representing a modifiable attribute of the associated room. For example, the physical property of the room may include a location of the room. The inventory record attribute may include, for example, a type of bed located in the room. The memory may further store machine readable instructions to generate keys to identify one or more of the inventory records based on attributes associated with the keys. A key may include a key index that matches the inventory record index for one or more of the inventory records. The memory may further store machine readable instructions to receive selection of keys from the generated keys, generate a virtual room pool by grouping the selected keys and the inventory records identified by the selected keys, and receive a search request related to one or more of the rooms. The search request may be entered, for example, by a guest. The search request may include a search criterion associated with an attribute associated with one or more of the selected keys. For example, the search request may be based on a location of a room, with the room location being associated with a similar location based attribute of one or more of the selected keys. The memory may further store machine readable instructions to use the search criterion and the attribute associated with the selected key to identify one or more of the inventory records from the virtual room pool, and output the one or more identified inventory records in response to the search request. For example, the output inventory record(s) may identify the room(s) that match the search request by the guest. The room inventory management system may include a processor to implement the machine readable instructions.

The room inventory management system and the method for room inventory management provide inventory management of rooms at a specific room number level. The system and the method provide for one-time room data entry with readily customized groupings (i.e., virtual room pools) and inventory record indices. Physical and durable aspects of a room (e.g., sleeping rooms, function, etc.) may be recorded in a single row of the inventory record for each room. The inventory record may include inventory record indices related to, for example, availability, room location, room number, date, etc., and inventory record attributes related to, for example, bed type, view, concierge information, room class, special features, etc. Additional indices and/or attributes developed at a future date may be added to the inventory record as needed. Additional attributes may also be added to the keys and/or inventory records based, for example, on changing business needs. The inventory records and the keys may be defined based on a star schema approach, which provides for scalable inventory management. The keys may be created, discarded, and/or modified to define virtual room pools, and to thus obtain a variety of user-defined views of room pools. The virtual room pools may be dynamically created based on any number of attributes that are relevant to guests and/or management. A definition of a virtual room pool may be changed by adding, deleting and/or modifying keys, key attributes and/or inventory record attributes. If time based sales of sleeping rooms (e.g., airport property day rooms) are desired, additional entries may be made in the inventory record for each time slot considered reservable. The attribute changes to the inventory records and/or keys may also be used to define and/or update ancillary services, such as, for example, availability of certain seasonal recreational privileges, spa availability, special events, etc. The search based on various attributes that may be modified and/or added may also be used to understand guest preferences.

The room inventory management system and the method for room inventory management also provide for iterative testing of inventory approaches, for example, based on testing of room pool modifications related to the addition, deletion and/or modification of keys, key attributes and/or inventory record attributes. The iterative testing approach thus provides flexibility for adjusting room pools based, for example, on changing business landscapes. The iterative testing approach also removes the risk of defining a rigid inventory approach that may be inadequate to support business needs.

The room inventory management system and the method for room inventory management described herein provide a technical solution to the technical problem of room inventory management. In many instances, manual room inventory management for hotels and the hospitality industry generally is not a viable solution given the number of available rooms, options, etc., and aspects related, for example, to changes in business landscape, management styles, etc. The system and method described herein provide the technical solution of automatically generating virtual room pools based, for example, on the generation and selection of keys to identify one or more of the inventory records based on attributes associated with the keys. Based, for example, on the selection of a plurality of the keys, a virtual room pool may be generated by grouping the selected keys and the inventory records identified by the selected keys. The system and method also provide the technical solution of generating a plurality of virtual room pools by grouping the selected keys for each of a plurality of selections and the inventory records identified by the selected keys for each of the plurality of selections. The system and method also provide the technical solution of automatic virtual room pool modification. For example, instead of manual modification of room pools, a virtual room pool may be modified, for example, by modifying a selection of a plurality of the keys, modifying the keys, and/or modifying the inventory records, and generating a modified virtual room pool by grouping the selected keys based on the modified selection and the inventory records identified by the selected keys based on the modified selection.

Those skilled in the art would appreciate that the room inventory management system and the method for room inventory management may be used in other industries, such as, for example, the transportation industry for seat reservation, the auto rental industry, real-estate sales and rental, etc.

FIG. 1 illustrates an architecture of a room inventory management system 100, according to an example of the present disclosure. The room inventory management system 100 may generally include an inventory record module 101 to generate a plurality of inventory records 102 for a room, of a plurality of rooms 103a to 103n, for example, for a hotel. The inventory record 102 may represent a record for a specific room, for example, for a specific property and on a specific date the specific room is available for reservation. For example, for the rooms 103a to 103n, the inventory records 102 may be specified for a predetermined time period (e.g., thirteen months, or 396 days), with each room 103a to 103n thus including an inventory record for each specified time interval (e.g., 1 day) in the predetermined time period (e.g., 396 days, and thus 396 inventory records). An administrator 104, or generally, a user of the inventory management system 100, may generate, modify and/or add attributes to the inventory records 102 using an administrator user interface 105. The administrator 104 may perform other functions related to the inventory management system 100 using the administrator user interface 105. A key generation module 106 is to generate one or more keys 107. The keys 107 may represent various attributes related to each of the rooms 103a to 103n. For example, the key generation module 106 may be used to generate a property key that may be used to find the inventory record 102 for a room based on property attributes, such as, for example, a geographic location on a map, a hotel name, a city name, etc. A virtual room pool generation module 108 is to generate one or more virtual room pools 109 based, for example, on one or more of the keys 107. A guest name record generation module 110 is to generate a guest name record using information, for example, from the appropriate inventory records 102 and one or more of the keys 107. An itinerary generation module 111 is to generate an itinerary for a guest 112, for example, from the appropriate inventory record 102, and one or more of the keys 107. An inventory partitioning module 113 is to scale the inventory records 102 of a database 114 into logical partitions. The database 114 may also store the inventory records 102, the keys 107, the virtual room pools 109, and other data related to the inventory management system 100. A query response module 115 is to receive a query 116 from the guest 112 at a guest user interface 117 and generate a response 118, for example, as one or more rooms that match criteria specified by the guest 112 from search and analysis of the appropriate inventory records 102 and the keys 107. The response 118 may be displayed or otherwise output to the guest 112 on the guest user interface 117. A product catalog generation module 119 is to generate virtual product catalogs using the appropriate inventory records 102, and one or more of the keys 107.

As described herein, the modules and other elements of the system 100 may comprise machine readable instructions stored on a non-transitory computer readable medium. In addition, or alternatively, the modules and other elements of the system 100 may comprise hardware or a combination of machine readable instructions and hardware.

Figure 2:
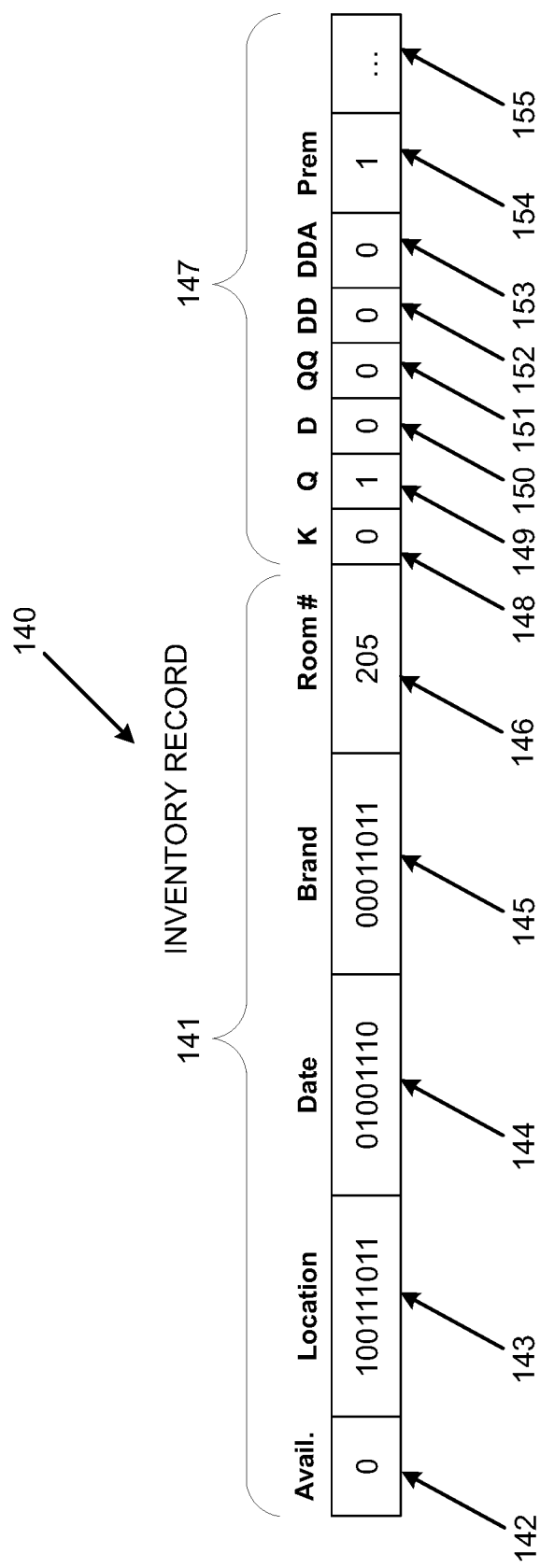
FIG. 2 illustrates an example of an inventory record for the room inventory management system, according to an example of the present disclosure.

Referring to FIGS. 1 and 2, the inventory record module 101 may generate a plurality of inventory records 102 for a room, of the plurality of rooms 103a to 103n, for example, for a hotel. An example of an inventory record 140 is illustrated in FIG. 2. The inventory record 140 shows an example of a specific room at a specific property on a specific day that may be available for reservation. The inventory record 140 may include inventory record indices 141 related, for example, to availability at 142, location at 143, date at 144, hotel brand at 145, and room number at 146. The inventory record indices 141, such as, for example, the location at 143, date at 144, hotel brand at 145, etc., may be determined (e.g., selected, or calculated, for example, using a hash function) based on the specifics of the information related to the indices 141, or inventory record attributes 147. The inventory record indices may represent a physical property (e.g., location) of an associated room, and other properties related to a room, such as, for example, availability, current date, hotel brand, room number, etc. The inventory record attributes 147 may be provided adjacent the inventory record indices 141. The inventory record indices may be represented in binary, for example, with a room availability being represented by a "0" for unavailable, and a "1" for available. The location index at 143 may represent a unique code specific to the given location. The inventory record indices may be represented by other methods, such as, for example, hexadecimal, decimal, octal, etc., and may be encrypted. The inventory record attributes 147 may include, for example, bed type (e.g., king bed at 148, queen bed at 149, double bed at 150, adjoining queen bed at 151, adjoining double bed at 152). Other inventory record attributes 147 may include, for example, disability discrimination act (DDA) compliance at 153, premium room quality at 154, etc. The inventory record attributes may also be represented by binary, or other methods, such as, for example, hexadecimal, decimal, octal, etc., and may be encrypted. Additional inventory record attributes developed at a future date may be added to the inventory record adjacent the existing inventory record attributes 147 as needed to extend the inventory record. For example, additional inventory record attributes related to a floor the room is on, view, concierge service, special features, etc., may be added to the inventory record at 155 onwards adjacent the existing inventory record attributes 147 as needed. If time based sales of sleeping rooms (e.g., airport property day rooms) are desired, additional entries may be added adjacent the existing inventory record attributes 147 for each time slot considered reservable. If a room is unavailable for maintenance at a specific future date, an inventory record attribute related to the unavailability of the room at the specific future date may be likewise added. Once a room is booked by a guest, the inventory record for that room may be updated to reflect the new status of the room. For example, if the room corresponding to the inventory record 140 is booked, the availability at 142 may be changed from available to unavailable. Likewise, if the room corresponding to the inventory record 140 is booked at a future date, the availability at 142 may be changed from available to unavailable for the future date corresponding to the date at 144.

Figure 3:
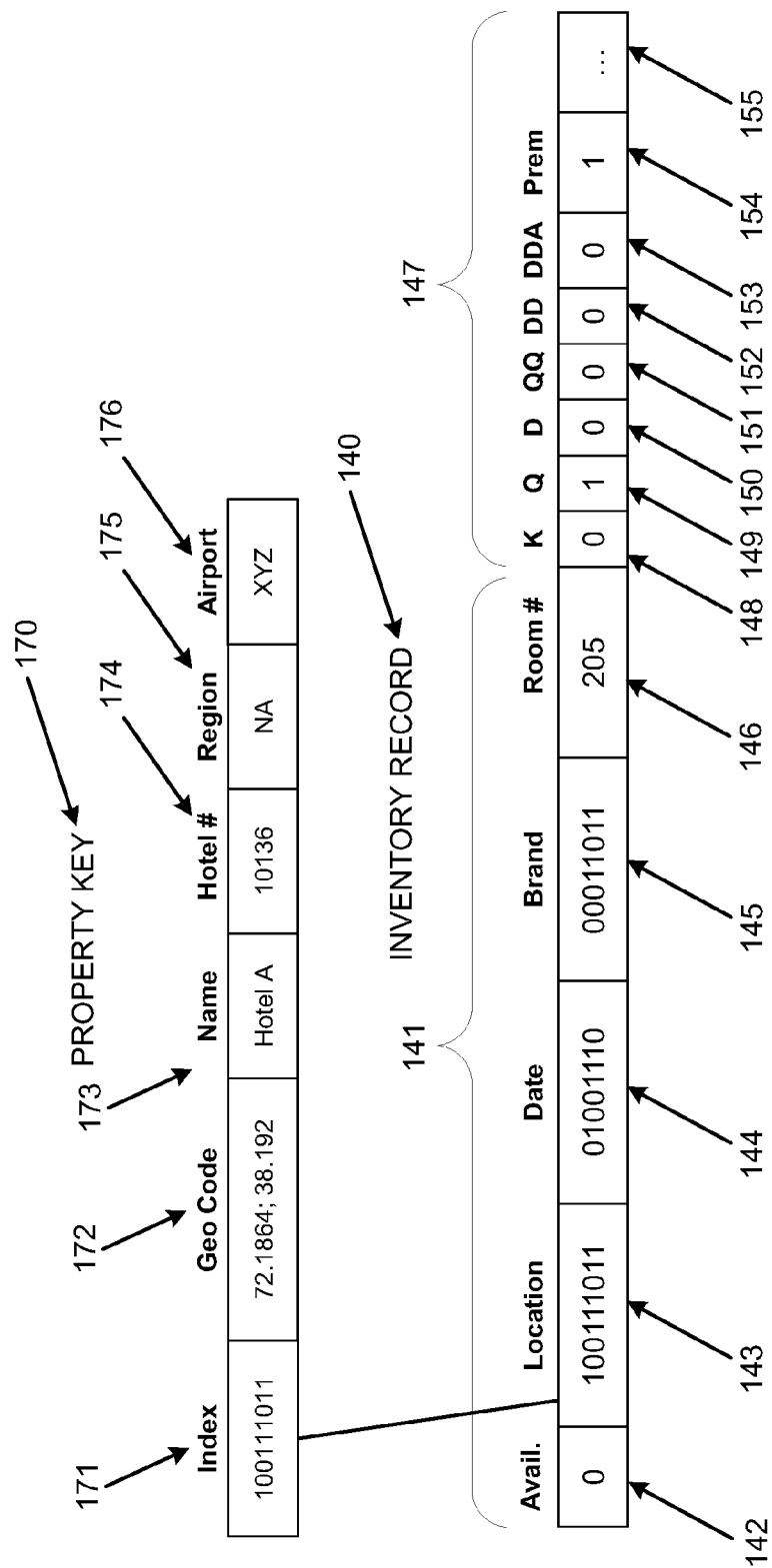
FIG. 3 illustrates an example of a property key used with the inventory record for the room inventory management system, according to an example of the present disclosure.
Figure 4:
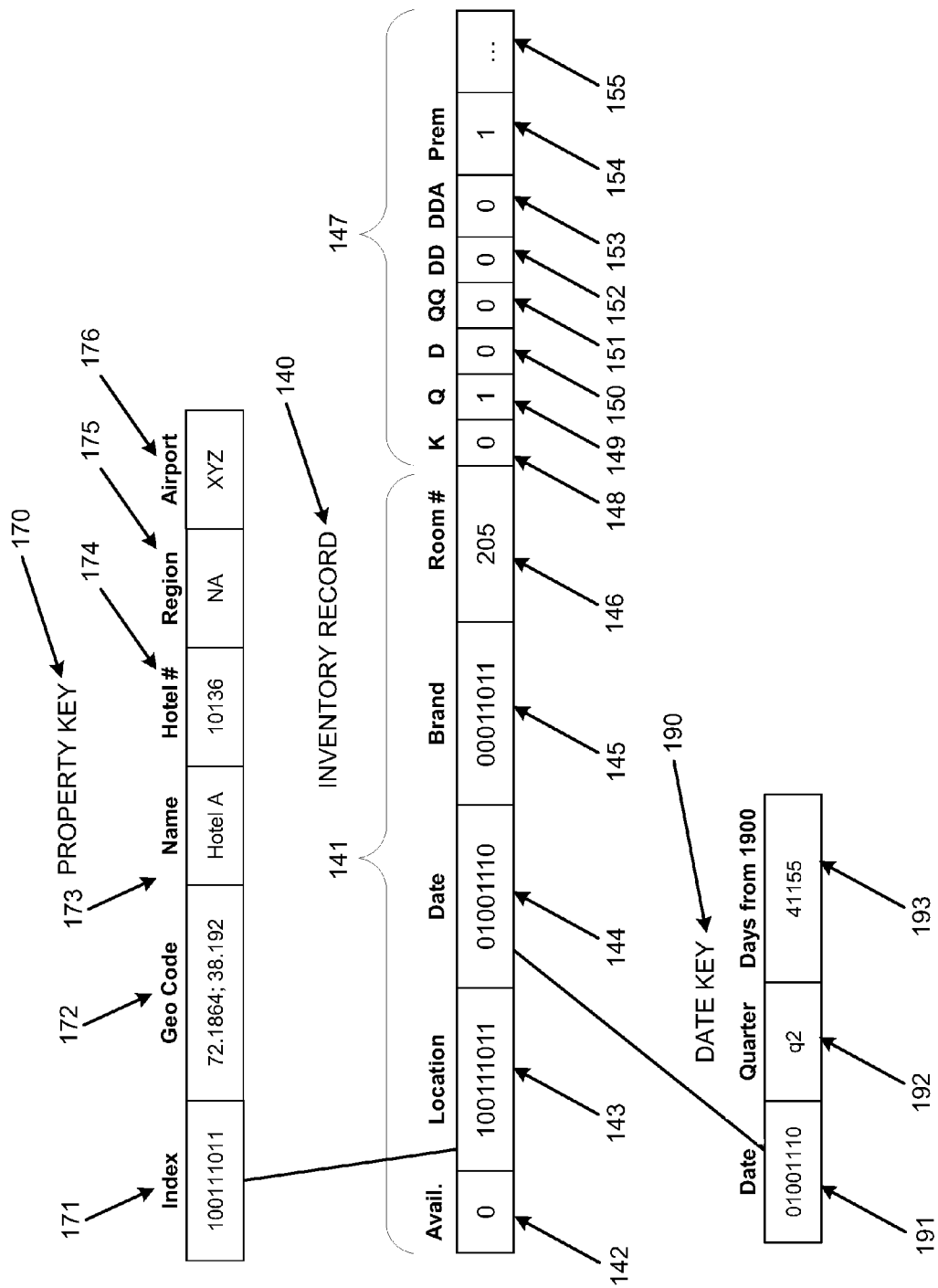
FIG. 4 illustrates an example of a date key used with the inventory record for the room inventory management system, according to an example of the present disclosure.
Figure 5:
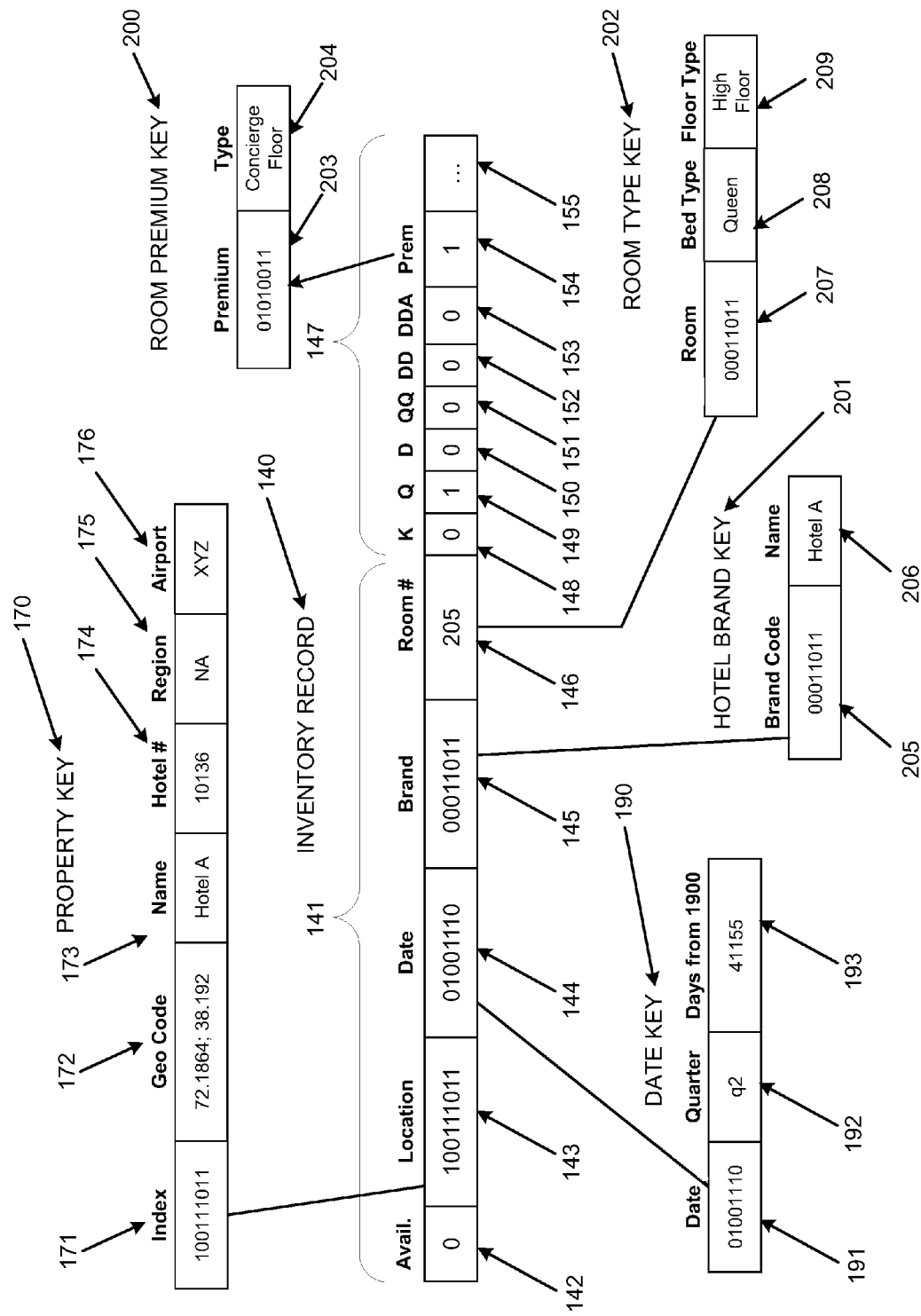
FIG. 5 illustrates an example of further keys used with the inventory record for the room inventory management system, according to an example of the present disclosure.
Figure 6:
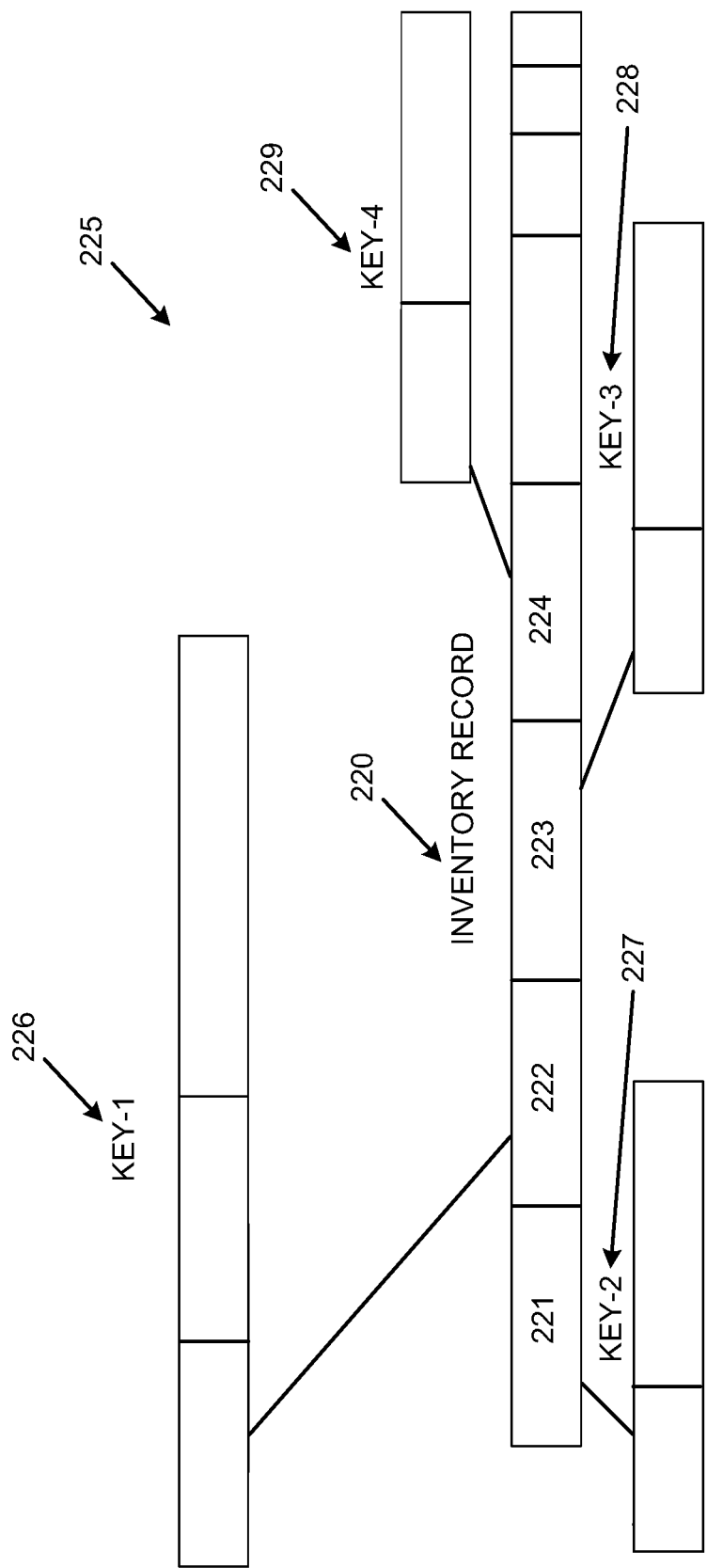
FIG. 6 illustrates an example of a room pool for the room inventory management system, according to an example of the present disclosure.

Referring to FIGS. 1-3, an example of a property key 170 used with the inventory record 140 is shown for the room inventory management system 100. The property key 170 may function as a location index to identify one or more inventory records based on any number of location attributes. For example, the property key 170 may be used to identify the inventory record 140 from the inventory records 102 related to room #205, which is shown as the room number at 146. The property key 170 may include an index at 171 that matches the location index at 143. In the example illustrated in FIG. 3, the property key 170 may be used to identify the inventory record 140 with the matching location index at 143 based on location attributes, such as, for example, geographic code at 172, property name at 173, hotel number at 174, region at 175, nearest airport at 176, etc. The property key 170 may include other location based attributes, such as, for example, city name, state name, etc. The index at 171 and the attributes of the property key 170 may be represented by binary, or other methods, such as, for example, hexadecimal, decimal, octal, etc., and may be encrypted. The property key 170 may also function as a data record to include, for example, shared amenities, such as, for example, pool information, airport pickup, etc. The property key 170 and the inventory record 140 may also include additional fields, such as, for example, fields that point to a media repository (i.e., pictures and videos of the hotel room), etc.

Referring to FIGS. 1-4, an example of a date key 190 used with the inventory record 140 is shown for the room inventory management system 100. The date key 190 may function as a date index to identify one or more inventory records for a requested date. For example, the date key 190 may be used to identify the inventory record 140 from the inventory records 102 related to room #205, which is shown as the room number at 146. The date key 190 may include an index at 191 that matches the date index at 144. In the example illustrated in FIG. 4, the date key 190 may be used to identify the inventory record 140 with the matching date index at 144 based on date attributes, such as, for example, quarter at 192, days from 1900 at 193, etc. The date key 190 may include other date based attributes, such as, for example, specific holiday, specific event, etc.

Referring to FIGS. 1-5, an example of other keys, such as a room premium key 200, a hotel brand key 201, and a room key 202 used with the inventory record 140 are shown for the room inventory management system 100. The room premium key 200, hotel brand key 201, and room type key 202 may respectively function as room premium, hotel brand and room type indices to identify one or more inventory records that match the attributes of the keys. For example, the room premium key 200, the hotel brand key 201, and the room type key 202 may be used to identify the inventory record 140 from the inventory records 102 related to room #205, which is shown as the room number at 146. The room premium key 200 may include an index at 203 that matches the premium room quality attribute at 154. In the example illustrated in FIG. 5, the room premium key 200 may be used to identify the inventory record 140 with the matching premium room quality attribute at 154 based on premium room quality attributes, such as, for example, whether the room is located at the concierge floor at 204, etc. The hotel brand key 201 may include an index at 205 that matches the hotel brand index 145. In the example illustrated in FIG. 5, the hotel brand key 201 may be used to identify the inventory record 140 with the matching hotel brand index at 145 based on brand attributes, such as, for example, a name of the hotel at 206, etc. The room type key 202 may include an index at 207 that matches the room number index at 146. In the example illustrated in FIG. 5, the room type key 202 may be used to identify the inventory record 140 with the matching room number index at 146 based on room attributes, such as, for example, bed type at 208, floor type at 209, etc. The room premium key 200, hotel brand key 201, and room type key 202 may include other related attributes in a similar manner as discussed with reference to the property key 170 and the date key 190. For example, the room premium key 200, hotel brand key 201, and room type key 202 may include additional attributes, such as, for example, a confirmation number, rewards information, a guest name, a guest address, a guest contact number, etc.

Referring to FIGS. 1-5, the key generation module 106 may generate additional keys 107 based on the search attributes requested by the guest 112 and/or added by the administrator 104. The additional keys may represent further indices or attributes that may be included in a search process for an inventory record. A search process may be enhanced by adding additional keys, additional attributes to existing keys, and/or additional attributes to the inventory records 102. Based on the snowflake schema approach of the room inventory management system 100, the additional attributes and keys may minimally impact search performance.

Referring to FIGS. 1-6, the virtual room pool generation module 108 may generate one or more virtual room pools 109 based, for example, on one or more of the keys 107 and associated inventory records 102. For example, referring to FIG. 6, an inventory record 220 is shown and includes inventory record indices at 221 and 222, and inventory record attributes at 223 and 224. For the inventory record 220, the virtual room pool generation module 108 may generate a virtual room pool 225 based on keys 1-4 respectively shown at 226-229. The keys 226-229 may be used to define the virtual room pool 225 based on search criteria entered for one or more of the rooms 103a to 103n by a guest 112 in the form of the query 116. Alternatively, the keys 226-229 may be used to define the virtual room pool 225 based on a definition of a virtual room pool by the administrator 104 that uses the attributes designated in the keys 226-229. The virtual room pool 225 may be modified, for example, by removing one or more of the keys 226-229, adding additional keys, and/or modifying attributes of the keys 226-229 and/or the inventory record indices and/or inventory record attributes of the inventory record 220. In this manner, the star schema approach for generating virtual room pools provides for the definition and re-definition of a variety of virtual room pools as needed based on the search initiated by the guest 112, or based on inventory records and/or keys selected and/or modified by the administrator 104. The definition of the virtual room pools may also allow for the rooms 103a to 103n to be managed in a logical manner, for example, by allowing management to define different virtual groups based on changes in business conditions, customer requirements, and for other aspects, such as, for example, testing of future products. The definition of the virtual room pools may further allow for the rooms 103a to 103n to be managed, for example, based on a user of the inventory management system 100. For example, different users, such as revenue managers, inventory managers, pricing plan developers, group sales managers, etc., may create different virtual room pools based on their specific business needs. Virtual room pools may also be defined, based, for example, on attributes associated with house-keeping, guest check-in or check-out, etc., to define house-keeping and other service schedules.

Figure 7:
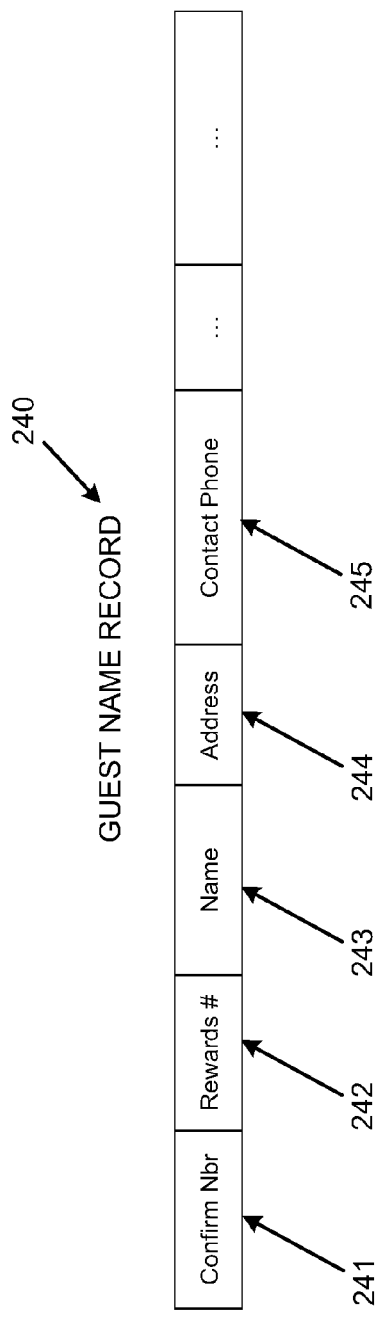
FIG. 7 illustrates an example of a guest name record for the room inventory management system, according to an example of the present disclosure.
Figure 8:
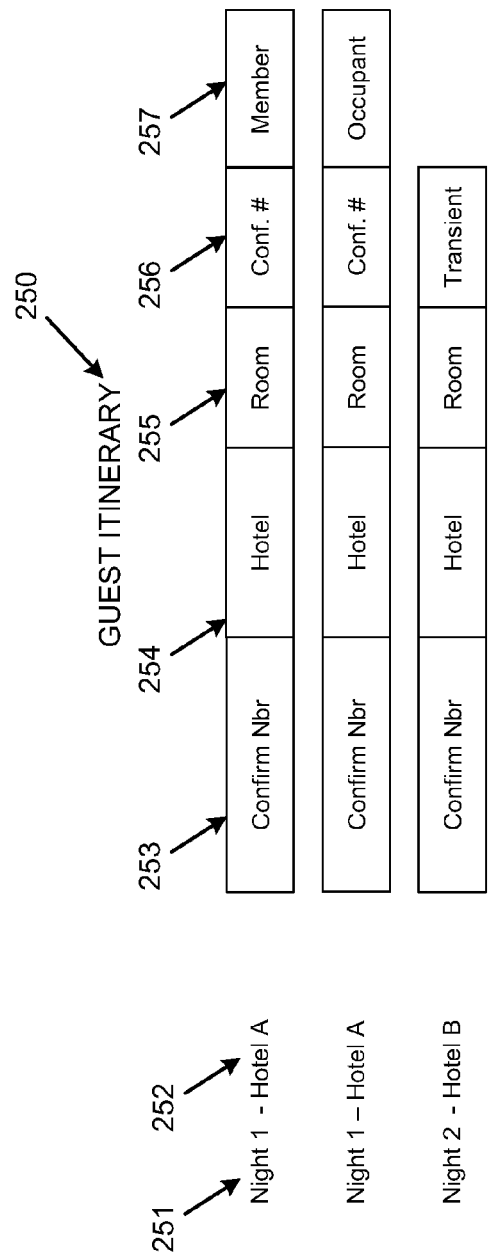
FIG. 8 illustrates an example of an itinerary for the room inventory management system, according to an example of the present disclosure.
Figure 9:
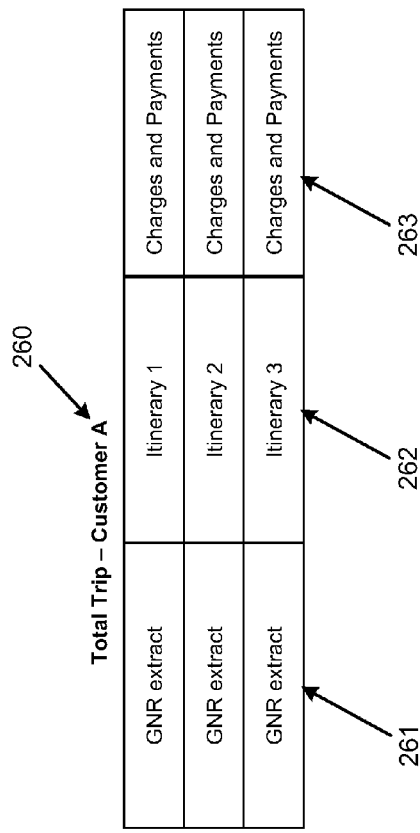
FIG. 9 illustrates an example of an itinerary being used as a basis for property management systems for the room inventory management system, according to an example of the present disclosure.

Referring to FIGS. 1, 7 and 8, once a room is selected and purchased by the guest 112, the inventory record and/or the associated keys for the selected room may be used to generate a guest name record. The guest name record generation module 110 may generate a guest name record 240 using information, for example, from the inventory record 102 that is selected and/or the associated keys 107. The guest name record 240 may include, for example, a confirmation number at 241, a rewards number at 242, the guest name and address respectively at 243 and 244, a guest contact phone number at 245, and other information as needed. The inventory record and/or the associated keys may also be used to generate a guest itinerary. The itinerary generation module 111 may generate an itinerary 250 for a guest 112, for example, from the appropriate inventory record 102, and one or more of the keys 107. The guest itinerary may include, for example, dates of stay at 251, location of the stay at 252, confirmation number at 253, hotel name at 254, room number at 255, confirmation details at 256, and guest status (e.g., member, occupant, etc.) at 257. The data related to the guest name record and the guest itinerary may be stored, for example, in a relational database. The guest itinerary 250 may also be used to identify additional sales opportunities, such as, for example, suggestions of transportation methods, recreational activities, further guest stays, etc.

Referring to FIGS. 1 and 7-9, the guest name record 240 and guest itinerary 250 may be used as a basis for property management systems that use, for example, guest name records, guest itinerary's, and related charges and payments. For example, a total trip for a guest is shown at 260. The total trip 260 may include information from the guest name records at 261, guest itineraries at 262, and related charges and payments at 263.

Figure 10:
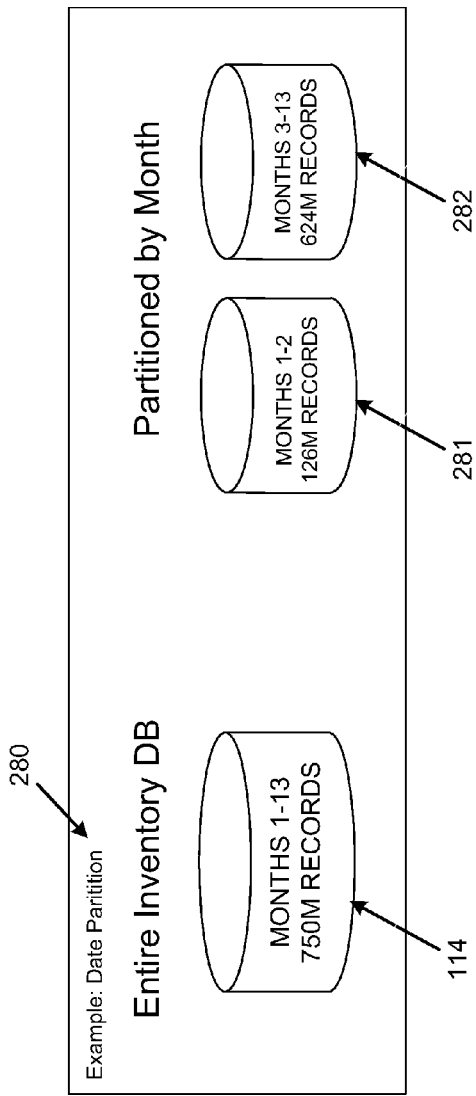
FIG. 10 illustrates an example of inventory partitioning for the room inventory management system, according to an example of the present disclosure.
Figure 11:
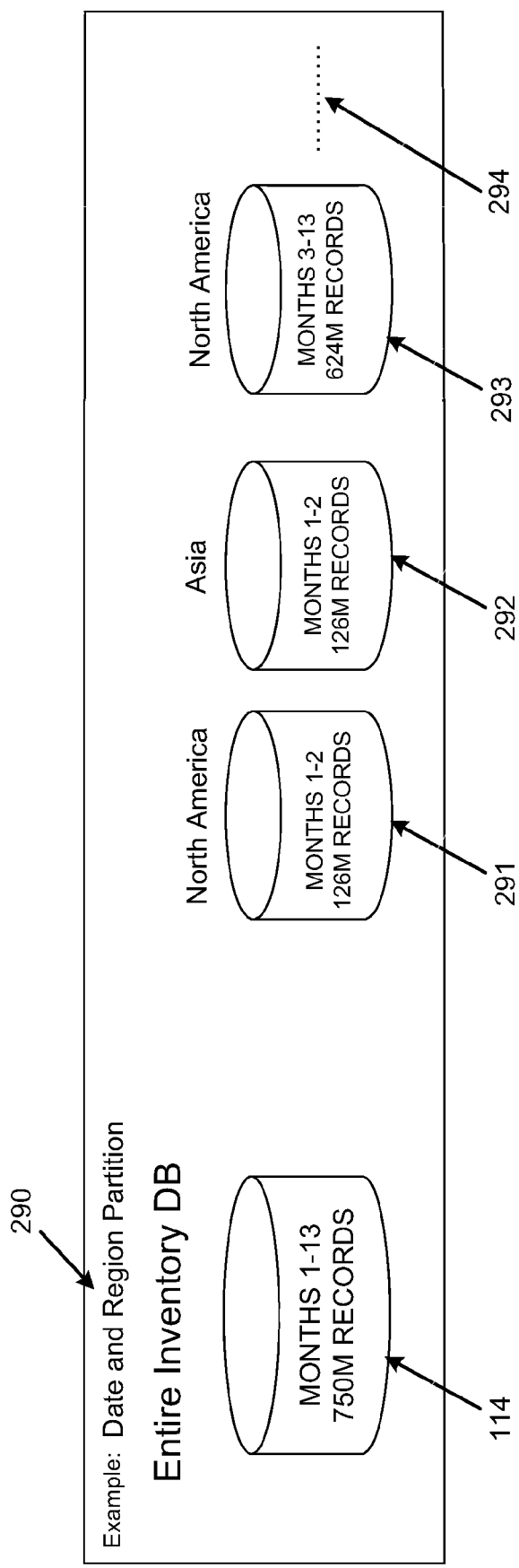
FIG. 11 illustrates another example of inventory partitioning for the room inventory management system, according to an example of the present disclosure.

Referring to FIGS. 1, 10 and 11, the inventory partitioning module 113 may scale the inventory records 102 of the database 114 into logical partitions. For example, the inventory records 102 may be partitioned by time (e.g., quarter, season, etc.), region (e.g., North America, Asia, Europe, etc.), etc., to thus provide for virtually infinite scaling of the database 114. Referring to FIG. 10, an example of partitioning of the inventory records 102 by month is shown at 280. For the database 114, an example of the inventory records 102 for the rooms 103a-103n for a period of thirteen months (e.g., 396 days) may include, for example 750 million records. The inventory records 102 may be partitioned by months into a first partition 281 for months one and two, and the remaining months for second partition 282. Referring to FIG. 11, an example of partitioning of the inventory records 102 by month and region is shown at 290. For the database 114, an example of the inventory records 102 for the rooms 103a-103n for a period of thirteen months may include, for example 750 million records. The inventory records 102 may be partitioned by months and regions into a first partition 291 for months one and two, and for North America, a second partition 292 for months one and two, and for Asia, a third partition 293 for the remaining months for the first partition 291 for North America, and additional partitions 294 as needed. The partitioning by the inventory partitioning module 113 may provide for faster data search and retrieval, based, for example, on analysis of a limited number of inventory records that are relevant to a search, or partitions that include inventory records that are searched at a higher percentage (e.g., inventory records that are closer to typical guest travel times, location, region, etc.).

Referring to FIG. 1, the product catalog generation module 119 may generate virtual product catalogs using one or more of the keys 107. For example, the product catalog generation module 119 may generate virtual product catalogs using the appropriate inventory records 102, and one or more of the keys 107. The virtual product catalog may include various views, such as, for example, a property management view, an inventory management view, an ancillary management view, a merchandising view, regional/cultural specific views, etc. Based on the foregoing view examples, the virtual product catalog may display virtual room pools including available rooms and associated attributes. For a room search by the guest 112 into a virtual product catalog, the response 118 may include one or more of the rooms 103a-103n that meet the attributes specified by the guest 112. If one or more of the attributes is unavailable, the response 118 may include one or more of the rooms 103a-103n that meet the available attributes, and a listing of attributes that are unavailable. The virtual product catalog may also be based on attributes related, for example, to a guest's past preferences. For example, if a guest preferred to stay in a specific room, an attribute related to the guest's preferences may be used to generate a virtual product catalog specific to the guest's preferences. Any incremental prices for available attributes may also be displayed, to thus provide selection options to a guest.

The query response module 115 may receive a query 116 from the guest 112 at the guest user interface 117 and generate a response 118, for example, as one or more rooms that match criteria specified by the guest 112 from search and analysis of the appropriate inventory records 102, and the keys 107. The inventory records 102 and the keys 107 that are searched and analyzed may be selected by selection of various attributes in the virtual product catalog. For a room search by the guest 112 into a virtual product catalog, the response 118 may include, for example, one or more of the rooms 103a-103n that meet the attributes specified by the guest 112. If one or more of the attributes is unavailable, the response 118 may include may include one or more of the rooms 103a-103n that meet the available attributes, and a listing of attributes that are unavailable.

Figure 12:
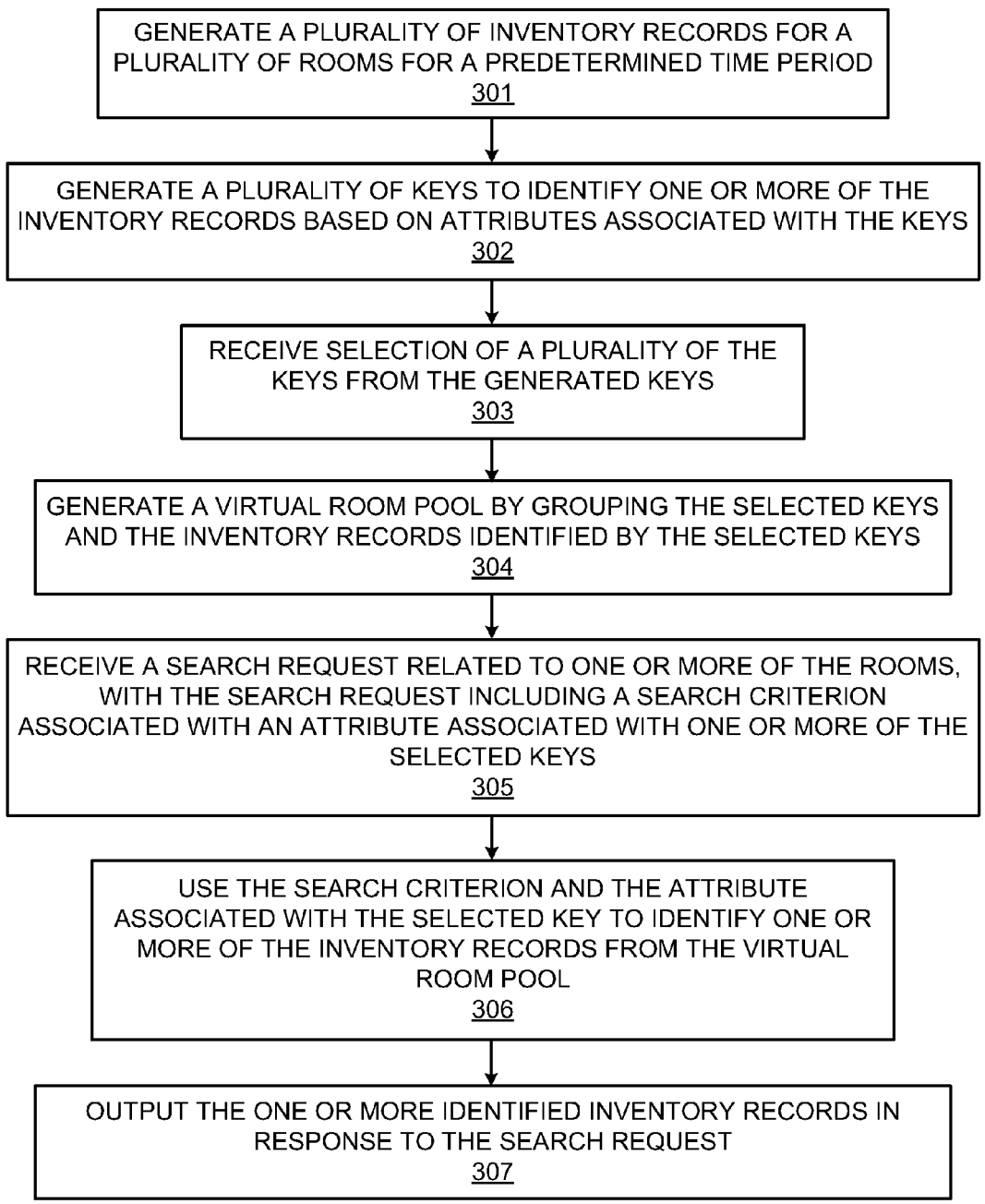
FIG. 12 illustrates a method for room inventory management, according to an example of the present disclosure.

FIG. 12 illustrates a flowchart of a method 300 for room inventory management, corresponding to the example of the room inventory management system 100 whose construction is described in detail above. The method 300 may be implemented on the room inventory management system 100 with reference to FIG. 1 by way of example and not limitation. The method 300 may be practiced in other systems.

Referring to FIG. 12, for the method 300, at block 301, a plurality of inventory records may be generated for a plurality of rooms for a predetermined time period. The inventory record may include an inventory record index representing a physical property of an associated room, and an inventory record attribute representing a modifiable attribute of the associated room. For example, referring to FIG. 1, the inventory record module 101 may generate a plurality of inventory records 102 for a room, of a plurality of rooms 103a to 103n, for example, for a hotel. For the example of FIG. 2, the inventory record 140 may include inventory record indices 141, with at least one of the inventory record indices 141 representing a physical property of an associated room, and inventory record room attributes 147. An inventory record may be generated for each of the plurality of rooms for each time interval in the predetermined time period. For example, for the rooms 103a to 103n, the inventory records 102 may be specified for a predetermined time period (e.g., thirteen months, or 396 days), with each room 103a to 103n thus including an inventory record for each specified time interval (e.g., 1 day) in the predetermined time period (e.g., 396 days, and thus 396 inventory records). The inventory record may be modified by adding, deleting and/or modifying inventory record attributes representing modifiable attributes of the associated room. The inventory records may be stored in a database (e.g., database 114), and the database may be partitioned (e.g., see FIG. 10) to access inventory records for a selected time interval of the predetermined time period, and/or one or more of the inventory record indices and/or the inventory record attributes. For example, the inventory partitioning module 113 may scale the inventory records 102 of the database 114 into logical partitions. The inventory record attribute may also represent a future modifiable attribute (e.g., an availability of certain attributes at a future date) of the associated room.

At block 302, a plurality of keys may be generated to identify one or more of the inventory records based on attributes associated with the keys. A key may include a key index that matches the inventory record index for at least one of the inventory records. For example, referring to FIG. 1, the key generation module 106 may generate one or more keys 107. The keys may be modified by adding, deleting and/or modifying the attributes associated with the keys. For example, the administrator 104 may generate, modify and/or add attributes to the keys 107 using the administrator user interface 105.

At block 303, selection of a plurality of the keys from the generated keys may be received. For example, referring to FIG. 1, the administrator 104 may select a plurality of the keys from the generated keys using the administrator user interface 105, and the selected keys may be received by the inventory management system 100.

At block 304, a virtual room pool may be generated by grouping the selected keys and the inventory records identified by the selected keys. For example, referring to FIG. 1, the virtual room pool generation module 108 may generate a virtual room pool 109 based, for example, on the selected keys 107 and the inventory records 102 identified by the selected keys. Alternatively, a plurality of selections of a plurality of the keys from the generated keys may be received, and a plurality of virtual room pools may be generated by grouping the selected keys for each of the plurality of selections and the inventory records identified by the selected keys for each of the plurality of selections. For example, referring to FIG. 1, the virtual room pool generation module 108 may generate a plurality of virtual room pools 109 based, for example, on a plurality of selections of one or more of the keys 107. The virtual room pool may be modified, for example, by receiving a modified selection of the plurality of the keys from the generated keys, and generating a modified virtual room pool by grouping the selected keys based on the modified selection and the inventory records identified by the selected keys based on the modified selection. A virtual product catalog may be generated based on the grouping of the selected keys and the inventory records identified by the selected keys. For example, the product catalog generation module 119 may generate virtual product catalogs using the appropriate inventory records 102, and one or more of the keys 107. A plurality of virtual room pools may be generated based on a different management criterion (e.g., revenue management, inventory management, pricing plan development, group sales management, etc.) associated with each generated virtual room pool.

At block 305, a search request related to one or more of the rooms may be received. The search request may include a search criterion associated with an attribute associated with one or more of the selected keys. For example, referring to FIG. 1, the query response module 115 may receive the query 116 from the guest 112 at the guest user interface 117 and generate the response 118, for example, as one or more rooms that match criteria specified by the guest 112 from search and analysis of the appropriate inventory records 102 and the keys 107. Alternatively, the search request related to one or more of the rooms may be received, with the search request including search criteria associated with attributes associated with a plurality of the selected keys. The search criteria and the attributes associated with the plurality of the selected keys may be used to identify one or more of the inventory records that matches all or some of the attributes associated with the plurality of the selected keys from the virtual room pool.

At block 306, the search criterion and the attribute associated with the selected key may be used to identify one or more of the inventory records from the virtual room pool. For example, referring to FIG. 1, the query response module 115 may generate the response 118, for example, as one or more rooms that match criteria specified by the guest 112 from search and analysis of the appropriate inventory records 102 and the keys 107.

At block 307, the identified inventory record(s) may be output in response to the search request. For example, referring to FIG. 1, the response 118 may be displayed or otherwise output to the guest 112 on the guest user interface 117. An itinerary may be generated based on the identified inventory record(s) output in response to the search request. The itinerary generation module 111 may generate an itinerary for the guest 112, for example, from the appropriate inventory records 102, and one or more of the keys 107.

Figure 13:
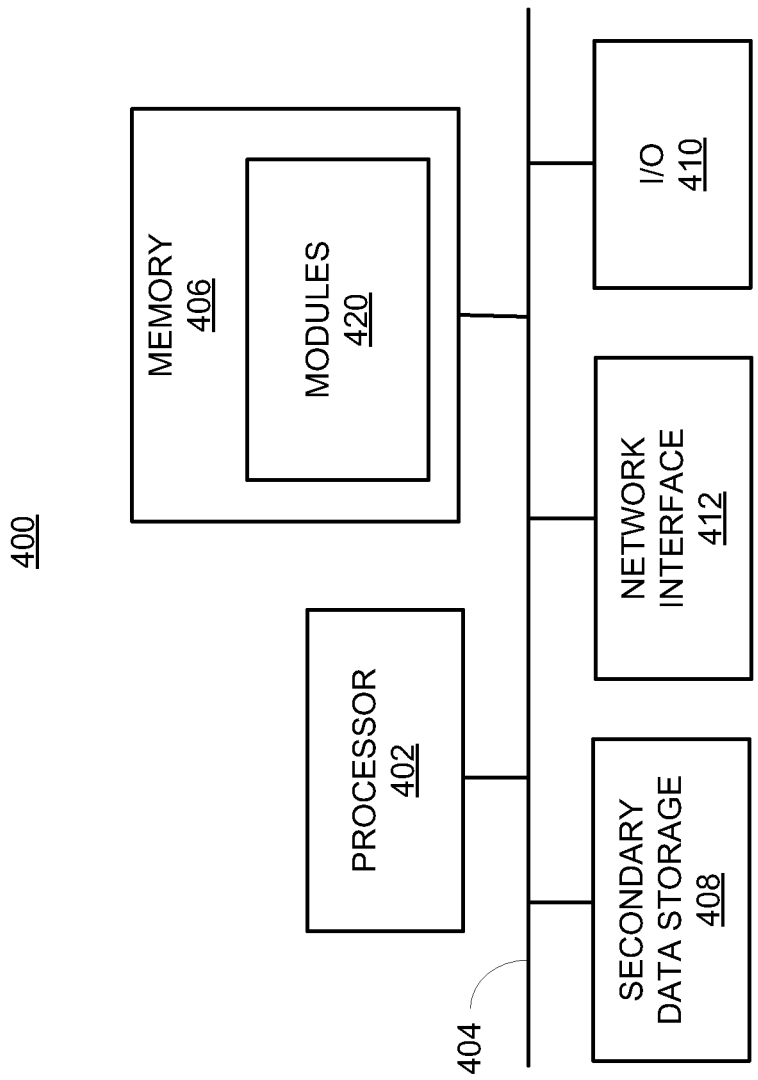
FIG. 13 illustrates a computer system, according to an example of the present disclosure.

FIG. 13 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules of the system 100 described with reference to FIGS. 1-10.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A room inventory management system comprising:
    an inventory record hardware module to generate a plurality of inventory records for a plurality of rooms for a predetermined time period, wherein each of the plurality of inventory records includes an inventory record index representing a physical property of an associated room, and an inventory record attribute representing a modifiable attribute of the associated room;
    a key generation hardware module to generate a plurality of keys to identify at least one of the plurality of inventory records based on key attributes associated with the plurality of keys, wherein each of the plurality of keys includes a key index that matches the inventory record index for at least one of the plurality of inventory records;
    a virtual room pool generation hardware module to
        receive a plurality of selections of a plurality of the keys from the generated keys, wherein the plurality of the selected keys for at least one of the plurality of selections is less than a total number of the generated keys, and
        generate a plurality of virtual room pools by grouping the plurality of the selected keys for each of the plurality of selections and the inventory records identified by the plurality of the selected keys for each of the plurality of selections; and
    a query response hardware module to
        receive a search request related to at least one of the plurality of rooms, wherein the search request includes a search criterion associated with a key attribute of the key attributes associated with at least one of the plurality of the selected keys for at least one of the plurality of selections,
        use the search criterion and the key attribute of the key attributes associated with the at least one of the plurality of the selected keys to identify at least one of the inventory records from at least one of the plurality of virtual room pools, and
        output the at least one identified inventory record in response to the search request, wherein the virtual room pool generation hardware module is to modify at least one of the plurality of virtual room pools by:
            receiving a modified selection of the plurality of the keys from the generated keys, wherein the plurality of the selected keys based on the modified selection is less than the total number of the generated keys; and
            generating a modified virtual room pool by grouping the plurality of the selected keys based on the modified selection and the inventory records identified by the plurality of the selected keys based on the modified selection.

2. The room inventory management system of claim 1, wherein the inventory record hardware module is to:
    modify the at least one identified inventory record by at least one of adding, deleting and modifying the inventory record attribute representing the modifiable attribute of the associated room.

3. The room inventory management system of claim 1, wherein the key generation hardware module is to:

modify the plurality of the selected keys for at least one of the plurality of selections by at least one of adding, deleting and modifying the key attributes associated with the plurality of the selected keys.

4. The room inventory management system of claim 1, wherein the query response hardware module is to:
receive the search request related to the at least one of the plurality of rooms, wherein the search request includes search criteria including the search criterion associated with the key attributes associated with the plurality of the selected keys for at least one of the plurality of selections;
use the search criteria and the key attributes associated with the plurality of the selected keys for at least one of the plurality of selections to identify the at least one of the inventory records that matches all of the key attributes associated with the plurality of the selected keys from at least one of the plurality of virtual room pools; and
use the search criteria and the key attributes associated with the plurality of the selected keys for at least one of the plurality of selections to identify the at least one of the inventory records that matches some of the key attributes associated with the plurality of the selected keys from at least one of the plurality of virtual room pools.

5. The room inventory management system of claim 1, further comprising an itinerary generation hardware module to:
generate an itinerary based on the at least one identified inventory record output in response to the search request.

6. The room inventory management system of claim 1, further comprising an inventory partitioning hardware module to:
store the plurality of inventory records in a database; and
partition the database to access the plurality of inventory records for a selected time interval of the predetermined time period.

7. The room inventory management system of claim 1, further comprising an inventory partitioning hardware module to:
store the plurality of inventory records in a database; and
partition the database based on at least one of the inventory record index and the inventory record attribute.

8. The room inventory management system of claim 1, further comprising a product catalog generation hardware module to:
generate a virtual product catalog based on the grouping of the plurality of the selected keys for each of the plurality of selections and the inventory records identified by the plurality of the selected keys for each of the plurality of selections.

9. The room inventory management system of claim 1, wherein each of the plurality of inventory records includes inventory record indices representing additional properties of the associated room, and inventory record attributes representing additional modifiable attributes of the associated room.

10. The room inventory management system of claim 1, wherein the key generation hardware module is to generate the plurality of keys by:
generating a property key to identify at least one of the plurality of inventory records based on location attributes associated with the property key, wherein the property key includes a property key index that matches an inventory record location index for at least one of the plurality of inventory records.

11. The room inventory management system of claim 1, wherein the key generation hardware module is to generate the plurality of keys by:
generating a date key to identify at least one of the plurality of inventory records based on date attributes associated with the date key, wherein the date key includes a date key index that matches an inventory record date index for at least one of the plurality of inventory records.

12. A method for room inventory management comprising:
generating, by an inventory record hardware module a plurality of inventory records for a plurality of rooms for a predetermined time period, wherein each of the plurality of inventory records includes an inventory record index representing a physical property of an associated room, and an inventory record attribute representing a modifiable attribute of the associated room;
generating, by a key generation hardware module, a plurality of keys to identify at least one of the plurality of inventory records based on key attributes associated with the plurality of keys, wherein each of the plurality of keys includes a key index that matches the inventory record index for at least one of the plurality of inventory records;
receiving, by a virtual room pool generation hardware module, a plurality of selections of a plurality of the keys from the generated keys, wherein the plurality of the selected keys for at least one of the plurality of selections is less than a total number of the generated keys;
generating, by the virtual room pool generation hardware module, a plurality of virtual room pools by grouping the plurality of the selected keys for each of the plurality of selections and the inventory records identified by the plurality of the selected keys for each of the plurality of selections; and
generating, by a product catalog generation hardware module, a virtual product catalog based on the grouping of the plurality of the selected keys for each of the plurality of selections and the inventory records identified by the plurality of the selected keys for each of the plurality of selections.

13. The method of claim 12, further comprising:
modifying, by the inventory record hardware module, each of the plurality of inventory records by at least one of adding, deleting and modifying the inventory record attribute representing the modifiable attribute of the associated room.

14. A non-transitory computer readable medium having stored thereon machine readable instructions for room inventory management, the machine readable instructions when executed cause at least one processor to:
generate, by an inventory record hardware module, a plurality of inventory records for a plurality of rooms for a predetermined time period, wherein each of the plurality of inventory records includes an inventory record index representing a physical property of an associated room, and an inventory record attribute representing a modifiable attribute of the associated room, and wherein the inventory record attribute includes a binary representation to match the inventory record index;
generate, by a key generation hardware module, a plurality of keys to identify at least one of the plurality of inventory records based on key attributes associated with the plurality of keys, wherein each of the plurality of keys includes a key index that matches the inventory record index for at least one of the plurality of inventory records;

receive, by a virtual room pool generation hardware module, a plurality of selections of a plurality of the keys from the generated keys, wherein the plurality of the selected keys for at least one of the plurality of selections is less than a total number of the generated keys; and generate, by the virtual room pool generation hardware module, a plurality of virtual room pools by grouping the plurality of the selected keys for each of the plurality of selections and the inventory records identified by the plurality of the selected keys for each of the plurality of selections.

15. The room inventory management system of claim 1, wherein the inventory record hardware module is to:

encrypt at least one of the inventory record index and the inventory record attribute.

16. The room inventory management system of claim 1, wherein at least one of the plurality of inventory records includes a field that points to a media repository related to the associated room.

17. The room inventory management system of claim 1, wherein the inventory record attribute includes a binary representation to match the inventory record index.

18. The room inventory management system of claim 1, wherein the inventory record hardware module is to:

calculate the inventory record index based on specifics of information related to inventory record indices including the inventory record index.

19. The room inventory management system of claim 1, wherein the key generation hardware module is to:

generate a key including an attribute-based key index that matches the inventory record attribute representing the modifiable attribute of the associated room.

20. The non-transitory computer readable medium according to claim 14, further comprising machine readable instructions to:

modify, by the inventory record hardware module, each of the plurality of inventory records by at least one of adding, deleting and modifying the inventory record attribute representing the modifiable attribute of the associated room.

\* \* \* \* \*